United States Patent Office 3,154,581
Patented Oct. 27, 1964

3,154,581
SUBSTITUTED AMINES
John R. Dice, Ann Arbor, Mich., assignor to Parke, Davis & Company, Detroit, Mich., a corporation of Michigan
No Drawing. Filed Oct. 18, 1961, Ser. No. 145,990
7 Claims. (Cl. 260—570.7)

The present invention relates to substituted amine compounds having useful pharmacodynamic properties and to methods for producing the same. More particularly, the invention relates to substituted amines and acid salts thereof having in their free base form the formula,

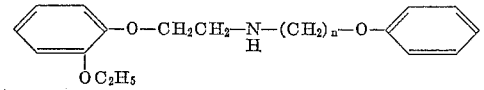

wherein $n$ is a whole number of 3 to 4.

In accordance with one embodiment of the invention compounds having the above formula are produced by subjecting an N-(ω-phenoxyalkyl)-o-ethoxyphenoxy-acetamide of formula,

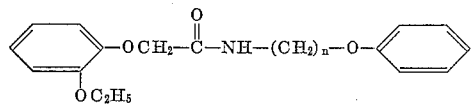

wherein $n$ has the above significance, to reduction and isolating the product of reduction in either the free base or acid addition salt form. Reduction is accomplished by reacting the acetamide compound with lithium aluminum hydride in an anhydrous inert organic solvent and decomposing the reaction product by treatment with an aqueous medium. The amount of lithium aluminum hydride required for the reaction is not critical and may be varied. Equivalent amounts of the acetamide and lithium aluminum hydride can be employed, but preferably the lithium aluminum hydride is employed in excess. For best results the reactants are combined slowly in such a manner as not to exceed the rate of reaction. The temperature during reaction is subject to considerable variation. Good results are obtained at temperatures in the range from about 0° C. to about 50° C., and for best results temperatures in the range from 15 to 35° C. are employed. Among various inert solvents which are suitable for the reaction may be mentioned the cyclic and alicyclic ethers such as diethyl ether, dioxane, tetrahydrofuran and the like and mixtures of these solvents with hydrocarbons such as benzene, toluene, xylene and the like. Following reaction with lithium aluminum hydride, the reaction mixture is decomposed with an aqueous medium such as water, dilute aqueous inorganic acids or bases and other media containing water. While in ordinary practice an excess of the aqueous medium is added, the amount of water present should be at least four moles for each mole of lithium aluminum hydride.

According to another embodiment of the invention compound having the above formula are produced by condensing 1-bromo-2-o-ethoxyphenoxy-ethane with an ω-phenoxy-alkylamine of formula,

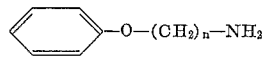

where $n$ has the above significance. In carrying out the condensation substantially equivalent quantities or an excess of either of the reactants may be employed, but for reasons of economy, as well as ease of purification of the reaction product, a ratio of two equivalents of the ω-phenoxy-alkylamine to one equivalent of the ethane reactant is preferred. An anhydrous organic solvent such as a hydrocarbon, lower aliphatic alcohol, lower aliphatic ether, lower aliphatic ketone, cyclic ketone, tertiary amine or the like may be employed. As specific examples of such solvents, there may be mentioned benzene, toluene, xylene, petroleum ether, ethanol, n-propanol, isopropanol, n-butanol, n-pentanol, diethyl ether, acetone, diethyl ketone, dioxane, pyridine and the like. Suitably, the reaction is carried out at temperatures between about 50 to 150° C. and preferably at the reflux temperature of the reaction mixture.

The free base product of the invention having the formula first set forth above, being basic in nature, forms acid addition salts by reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, malate, maleate, p-toluenesulfonate, benzenesulfonate and sulfamate. The acid addition salts are conveniently formed by mixing the free base with at least an equivalent amount of the acid in a solvent in which the salt is insoluble, particularly after chilling, thereby permitting recovery of the desired salt as a solid phase. Whereas both the free base and salt forms of the product are useful for the purposes of the invention, the salts are generally preferred in those cases where solid and essentially neutral product forms, as well as increased water solubility, are desired. The invention contemplates the acid salts broadly. Those salts which are unsuited to particular uses, as for example uses where toxicity is a problem, are useful as intermediates, being readily convertible to non-toxic acid salts by means which per se are known to those in the art.

The products of the invention possess outstanding anti-inflammatory activity as well as other pharmacological properties when administered by either the parenteral or oral routes. For example, it has been established by the test procedure of Winder et al., Arch. Int. Pharmacodyn., 1958, CXVI, pages 261–292, that an oral dose of less than 25 mg./kg. in the guinea pig serves to mitigate ultraviolet erythema. The products of the invention are relatively non-toxic and hence have application as anti-inflammatory agents.

The invention is illustrated by the following examples:

*Example 1*

N - (3 - phenoxypropyl)-o-ethoxyphenoxy-acetamide (25.5 g.) is added portionwise to a mixture of 11.4 g. of lithium aluminum hydride in 750 ml. of dry ether. The reaction mixture is refluxed for 17 hours, allowed to cool, and water (12 ml.), 20% aqueous sodium hydroxide solution (9 ml.) and water (42 ml.) are added successively. The resulting mixture is filtered and the filtrate is allowed to separate into an ether layer and an aqueous layer. The ether layer is recovered and the water layer is extracted successively with three 250-ml. portions of ether. The ether solution and ether extracts are combined, washed with 150 ml. of 5% aqueous sodium hydroxide solution and 150 ml. of water, dried over magnesium sulfate and filtered. The filtrate is concentrated to a small volume by removal of the solvent under vacuum and the residual product, 2-(o-ethoxyphenoxy)ethyl-3-phenoxypropyl-amine, is treated with an excess of hydrogen chloride dissolved in isopropanol. The product, 2-(o-ethoxyphenoxy)ethyl-3-phenoxypropyl-amine hydrochloride, is precipitated by addition of ether and is recovered by filtration; M.P. 75–80° C. after purification by dissolving in anhydrous ethanol and precipitating by adding anhydrous ether.

The hydrobromide salt of 2-(o-ethoxyphenoxy)ethyl-3-phenoxypropyl-amine is prepared by dissolving the free base in ether and treating the resulting solution with an excess of dry hydrogen bromide. The product obtained is purified by recrystallization from isopropanol-methanol (6:1) mixture. Likewise, the sulfate salt can be prepared by dissolving the free base in an ethanol solution containing one equivalent of sulfuric acid. The salt is precipitated by addition of ether and purified by recrystalization from isopropanol-methanol mixture. The p-toluenesulfonate salt can be prepared by dissolving the free base in isopropanol and adding the solution to an isopropanolic solution containing at least one equivalent of p-toluenesulfonic acid. The salt is precipitated by the addition of ether and purified by dissolving in anhydrous ethanol and precipitating with anhydrous ether.

By substituting N-(4-phenoxybutyl)-o-ethoxyphenoxy-acetamide, in equivalent amount, for N-(3-phenoxypropyl)-o-ethoxyphenoxy-acetamide in the foregoing procedure, one obtains 2-(o-ethoxyphenoxy)ethyl-4-phenoxy-butyl-amine hydrochloride.

The N - (ω-phenoxyalkyl)-o-ethoxyphenoxy-acetamide starting materials can be prepared by condensing o-ethoxyphenol with chloroacetic acid, converting the resulting o-ethoxyphenoxy-acetic acid to the corresponding acid chloride by treatment with thionyl chloride and condensing the acid chloride with the appropriate ω-phenoxy-alkyl-amine. The following procedure for the preparation of N-(3-phenoxypropyl)-o-ethoxyphenoxy-acetamide is illustrative: o-ethoxyphenol (138.2 g.) is dissolved in a solution of sodium hydroxide (100 g.) in water (400 ml.). Chloroacetic acid (189 g.) in 150 ml. of water is added portionwise with stirring, over approximately one hour. The mixture is heated on a steam bath for two hours and allowed to stand for about 16 hours. The reaction mixture is acidified with concentrated hydrochloric acid to pH=1 and is extracted successively with ether. The ether extracts are combined and dried over magnesium sulfate. The solvent is removed by evaporation and the residue distilled in vacuo. o-Ethoxyphenoxy-acetic acid, recovered as the fraction distilling at 114–130° C./0.15 mm. which solidifies after standing, is recrystallized from cyclohexane, washed with petroleum ether and dried; M.P. 64–68° C. To 150 ml. of thionyl chloride cooled in an ice bath is added portionwise 78.5 g. of o-ethoxyphenoxy-acetic acid. The mixture is heated on a steam bath for 15 minutes, excess thionyl chloride is removed from the reaction mixture under vacuum, and benzene is added and evaporated under vacuum. The resulting residual product, o-ethoxyphenoxy-acetyl chloride, in the amount of 15 g. is added to a stirred solution of 3-phenoxypropyl-amine (22.7 g.) in benzene (100 ml.) and the mixture refluxed for one hour. Ether is added to the reaction mixture to precipitate 3-phenoxy-propyl-amine hydrochloride, the mixture is filtered and the solvents are removed from the filtrate under vacuum. The residual product is N-(3-phenoxypropyl)-o-ethoxyphenoxy-acetamide.

*Example 2*

A solution of 1-bromo-2-o-ethoxyphenoxy-ethane (35.6 g.) in dry isopropanol (200 ml.) is added slowly to a refluxing solution of 4-phenoxy-butyl-amine (44.2 g.) in isopropanol (50 ml.). The reaction mixture is refluxed for 67 hours after which substantially all of the solvent is removed from the reaction mixture by distillation under vacuum. The residue is taken up in water (250 ml.) and ether (500 ml.), the layers are separated and the ether layer is washed with 5% aqueous sodium hydroxide solution (100 ml.). The ether layer is separated, dried over magnesium sulfate and the ether removed under vacuum. The residue is distilled under vacuum and the free base product, 2 - (o - ethoxyphenoxy)ethyl-4-phenoxybutyl-amine, is collected as the fraction boiling at 125–146° C./0.02–0.03 mm. The free base is dissolved in dry ether and dry hydrogen chloride is bubbled into the solution. The resulting product which separates, 2-(o-ethoxyphenoxy)ethyl-4-phenoxy-butyl-amine hydrochloride, is collected and recrystallized from absolute alcohol; M.P. 99–100° C. A water-soluble hydrobromide salt is obtained by treating an ethereal solution of the free base with one equivalent of hydrogen bromide in isopropyl alcohol. The sulfuric acid salt is obtained by dissolving the free base in ethanol containing an equivalent quantity of sulfuric acid, recovering the precipitate formed and recrystallizing the same from an isopropanol-methanol mixture. The citrate salt is obtained by mixing a solution of the free base in ethanol with an ethanolic solution containing an equivalent of citric acid, isolating the resulting precipitate and recrystallizing the same from ethanol.

By substituting 3-phenoxy-propyl-amine in equivalent amount for 4-phenoxy-butyl-amine in the above procedure, one obtains 2-(o-ethoxyphenoxy)ethyl-3-phenoxy-propyl-amine and the corresponding hydrochloride salt.

The starting material, 1-bromo-2-o-ethoxyphenoxy-ethane, can be prepared as follows: ethylene carbonate (704 g.) is added slowly with stirring to a mixture of potassium carbonate (532.8 g.), toluene (1500 ml.) and o-ethoxyphenol (500 g.). The mixture is refluxed for one day, allowed to stand for two days, is then transferred into a 5-liter mixture (2:1) of 20% aqueous sodium hydroxide solution and ice. The resulting mixture is extracted successively with three one-liter portions of ether, the ether extracts are combined, dried and the solvent removed under vacuum. The residue is distilled under vacuum; 2-o-ethoxyphenoxy-ethanol is obtained as the fraction distilling at 163–170° C./21–24 mm. Phosphorus tribromide (546 g.) is added slowly at −10° C. to 546 g. of 2-o-ethoxyphenoxy-ethanol and the resulting mixture is stirred first at this temperature for two hours and then at room temperature overnight. The mixture is transferred into ice water (approx. 2 l.) and extracted successively with ether. The combined ether extracts are washed with 6 N sulfuric acid, dried, the ether removed by evaporation and the residue distilled under vacuum; 1-bromo-2-o-ethoxyphenoxy-ethane is obtained as the fraction distilling at 87–91° C./0.07 mm.

I claim:

1. A compound of the class consisting of 2-(o-ethoxyphenoxy)ethyl-3-phenoxypropyl-amine, 2-(o-ethoxyphenoxy)ethyl-4-phenoxybutyl-amine, and acid addition salts thereof.

2. An acid addition salt of 2-(o-ethoxyphenoxy)ethyl-3-phenoxypropyl-amine.

3. 2 - (o-Ethoxyphenoxy)ethyl-3-phenoxypropyl-amine hydrochloride.

4. 2-(o-Ethoxyphenoxy)ethyl-3-phenoxypropyl-amine.

5. An acid addition salt of 2-(o-ethoxyphenoxy)ethyl-4-phenoxybutyl-amine.

6. 2 - (o-Ethoxyphenoxy)ethyl-4-phenoxybutyl-amine hydrochloride.

7. 2-(o-Ethoxyphenoxy)ethyl-4-phenoxybutyl-amine.

References Cited in the file of this patent

UNITED STATES PATENTS 2,599,001    Kerwin et al. _____ June 3, 1952

OTHER REFERENCES

Wagner et al.: "Synthetic Organic Chemistry," N.Y., Wiley & Sons, Inc., page 660 (1953), QD262W24.